United States Patent [19]

Perry

[11] Patent Number: 5,668,575
[45] Date of Patent: Sep. 16, 1997

[54] DEVICE FOR SECURING A MOUSE BALL

[76] Inventor: Robert C. Perry, 5755 SW. Willow La., Lake Oswego, Oreg. 97035-5340

[21] Appl. No.: 599,043

[22] Filed: Feb. 9, 1996

Related U.S. Application Data

[63] Continuation-in-part of Ser. No. 546,227, Oct. 20, 1995.
[51] Int. Cl.$^6$ ........................................ G09G 5/08
[52] U.S. Cl. ........................... 345/163; 74/471 XY
[58] Field of Search ........................... 345/163, 164, 345/165, 166, 167; 74/471 XY; 273/148, 438

[56] References Cited

U.S. PATENT DOCUMENTS 4,612,539  9/1986  Hasogoe et al. .................. 345/164
4,933,670  6/1990  Wislocki ............................ 345/167
5,457,479  10/1995  Cheng .............................. 345/167

*Primary Examiner*—Mark R. Powell
*Assistant Examiner*—Matthew Luu
*Attorney, Agent, or Firm*—Smith-Hill and Bedell

[57]  ABSTRACT

A computer mouse comprises a housing having a bottom wall that defines an opening, a retainer plate fitted in the opening and formed with a circular hole, and a mouse ball in the housing and projecting through the circular hole. A seal adheres to both the bottom wall of the housing and the retainer plate, whereby removal of the retainer plate from the opening is resisted.

16 Claims, 1 Drawing Sheet

DEVICE FOR SECURING A MOUSE BALL

CROSS-REFERENCE TO RELATED APPLICATION

This application is being filed as a continuation-in-part of copending application Ser. No. 08/546,227 filed Oct. 20, 1995.

BACKGROUND OF THE INVENTION

This invention relates to a device for securing a mouse ball.

A computer mouse is widely used as a pointing device with personal computers. A common form of computer mouse comprises a housing for gripping in the user's hand, the housing having a bottom wall that slides over a mouse pad. The bottom wall of the housing is formed with an opening that contains a removable retainer plate, and the retainer plate is formed with a circular hole. The diameter of the circular hole in the retainer plate is somewhat smaller than the diameter of the mouse ball, and so the mouse ball is held captive in the housing but protrudes through the hole in the retainer plate.

The retainer plate can be easily removed, often simply by rotating the retainer plate in a counterclockwise direction, and the mouse ball can then be removed. This feature is advantageous because it allows the mouse ball to be removed for cleaning without need for special tools. However, in some respects this feature can also be a disadvantage, particularly when applied to a computer mouse that is used in a school, because if the mouse ball can be easily removed for cleaning by a teacher or technician, it can also be easily removed by a curious or bored student whose plans do not include cleaning and replacing the mouse ball. If unauthorized removal of a mouse ball is not detected by a teacher or other person having reason to ensure that the mouse ball is promptly replaced, the ball might be misplaced and it might then be necessary to obtain either a new mouse ball or replace the entire mouse.

SUMMARY OF THE INVENTION

In accordance with a first aspect of the invention is provided a computer mouse comprising a housing having a bottom wall that defines an opening, a retainer plate fitted in the opening and formed with a circular hole, a mouse ball in the housing and projecting through the circular hole, and a seal that adheres to both the bottom wall of the housing and the retainer plate, whereby removal of the retainer plate from the opening is resisted.

In accordance with a second aspect of the invention there is provided a seal for a computer mouse that includes a housing having a bottom wall that defines an opening, a retainer plate fitted in the opening and formed with a circular hole, and a mouse ball in the housing and projecting through the circular hole, the seal comprising a sheet-form piece of self-adhesive material defining a hole that is larger than the circular hole in the retainer plate, and wherein the seal has an extent such that when it is applied to the retainer plate with the hole in the seal concentric with the hole in the retainer plate, the seal adheres to both the bottom wall of the housing and the retainer plate, whereby removal of the retainer plate from the opening is resisted.

In accordance with a third aspect of the invention there is provided a seal for a computer mouse that includes a housing having a bottom wall that defines an opening, a retainer plate fitted in the opening and formed with a circular hole, and a mouse ball in the housing and projecting through the circular hole, the seal comprising a sheet-form piece of self-adhesive material defining a hole that is larger than the circular hole in the retainer plate, and wherein the seal has an extent such that when it is applied to the retainer plate with the hole in the seal concentric with the hole in the retainer plate, the seal adheres to both the bottom wall of the housing and the retainer plate, whereby removal of the retainer plate from the opening is resisted, and wherein the seal is formed with at least one line of weakness and the adhesive is selected relative to tensile strength of the seal across the line of weakness such that the seal adheres to at least the retainer plate with a force that exceeds the tensile strength of the seal across the line of weakness, whereby the seal breaks into at least two fragments when force is applied tending to remove the seal from the retainer plate.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
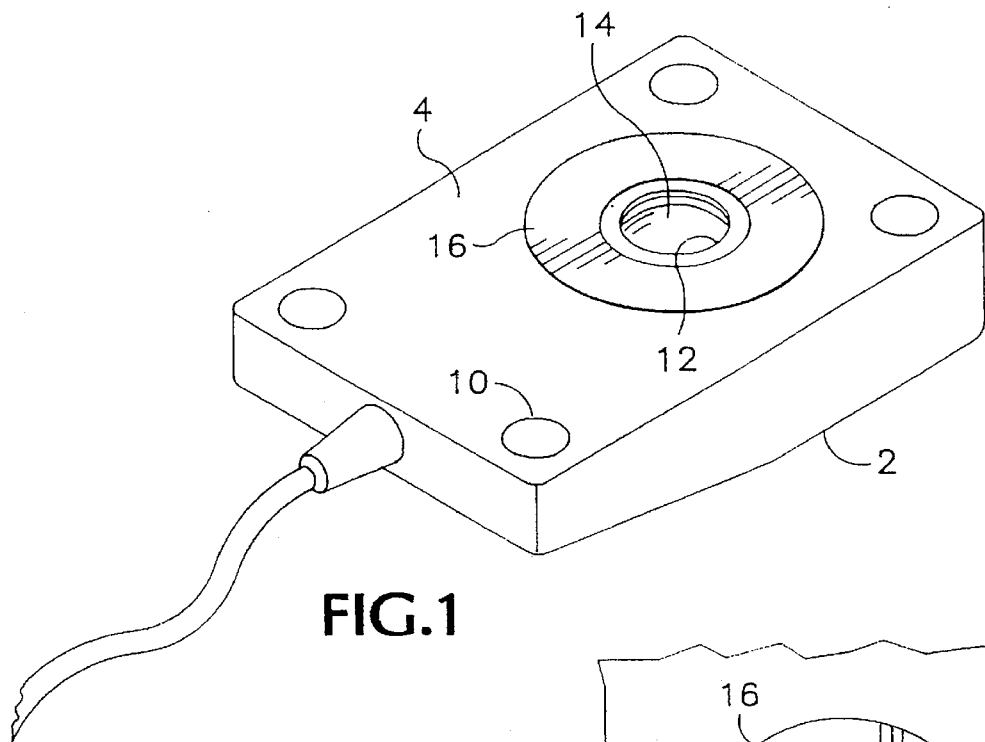
FIG. 1 is a bottom perspective view of a computer mouse in accordance with the present invention.
Figure 2:
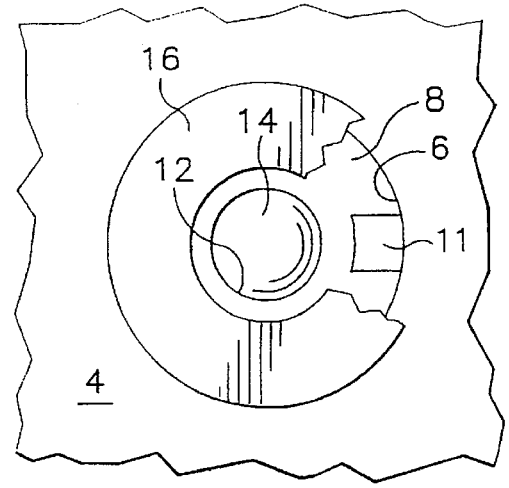
FIG. 2 is a bottom partial plan view of the mouse shown in FIG. 1, with the seal shown partly broken away.

The computer mouse shown in the drawings comprises a housing 2 having a bottom wall 4 that is formed with a circular opening 6 that is about 1.4 inch (3.6 cm) in diameter and receives a retainer plate 8. The housing 2 and the retainer plate 8 are made of a synthetic polymer material. Raised feet 10 project from the bottom wall 4 and slide on a mouse pad or other driving surface when the mouse is in use for supporting the mouse with the main area of the bottom wall above the driving surface. The feet 10 may include inserts (not shown) of PTFE or other low friction material. The retainer plate is coupled to the bottom wall of the housing using a bayonet-type coupling. By rotating the retainer plate through an angle of about 45° in the counter-clockwise direction, the plate can be disengaged from the bottom wall. Similarly, the plate can be re-engaged with the bottom wall by positioning the plate in the proper angular position relative to the bottom wall, inserting the plate in the opening, and then rotating the plate through about 45° in the clockwise direction. The retainer plate is formed with two diametrically opposed molded formations, one of which (designated 11) can be seen in FIG. 2. The molded formations may include arrows indicating the direction in which the retainer plate must be rotated in order to disengage it from the bottom wall of the mouse housing and/or ribs to allow rotational force to be applied to the retainer plate.

The removable retainer plate is formed with a circular hole 12 that is about 0.5 inch (1.3 cm) in diameter and allows the mouse ball 14 to project from the housing while remaining captive within the housing. When the retainer plate is removed, the mouse ball can be removed from the housing.

In order to resist unauthorized removal of the retainer plate, an annular seal 16 of self-adhesive material is applied to the bottom wall of the mouse housing and to the retainer plate. The inner diameter of the annular seal is about 5/8 inch (1.6 cm) and its outer diameter is about 1¾ inch (4.4 cm). Thus, the internal diameter of the annular seal is greater than the diameter of the hole in the retainer plate but less than the diameter of the opening in the bottom wall of the housing, and the external diameter of the annular seal is greater than the diameter of the opening in the bottom wall of the housing. Therefore, when the seal is applied to the bottom surface of the mouse, with the hole in the annular seal concentric with the hole in the retainer plate, the seal adheres to both the retainer plate and the bottom wall of the housing, and the retainer plate 8 cannot be turned in the opening 6 so long as the seal 16 remains intact and in position. The seal is opaque, so that molded formations or indicia on the retainer plate that provide instruction on removal of the retainer plate are not visible while the seal remains intact and in position.

Preferably, the seal is made of a tough synthetic polymer material, such as the 0.02 inch (0.05 cm) thick self adhesive silver film material that is sold by 3M Corporation under the designation Mylar 7872 or the 0.04 inch (0.1 cm) thick self adhesive vinyl film that is sold by Vasson under the designation 41196. The adhesive on the film adheres strongly to the material of the mouse housing, so that the seal is resistant to removal. The Mylar film is hard wearing and is therefore preferred for applications in which the mouse does not have feet, such that the seal runs directly on the driving surface when the mouse is in use. The vinyl film conforms well to an uneven surface and is therefore preferred when the bottom wall of the housing or the retainer plate is formed with ridges or other projections that might impair secure attachment of the seal. The vinyl film tends to break up when it is peeled off a surface to which it has been attached, so that it is difficult to remove the seal in one piece, and this feature may be advantageous with regard to preventing unauthorized removal of the seal.

The seal is supplied to the user on a release sheet 26 (FIG. 3), such as a waxed paper, to which the seal adheres only weakly. The user can readily peel the seal from the release sheet, without damaging the seal, and apply it to the bottom wall of the mouse housing, to which the seal adheres strongly.

Figure 3:
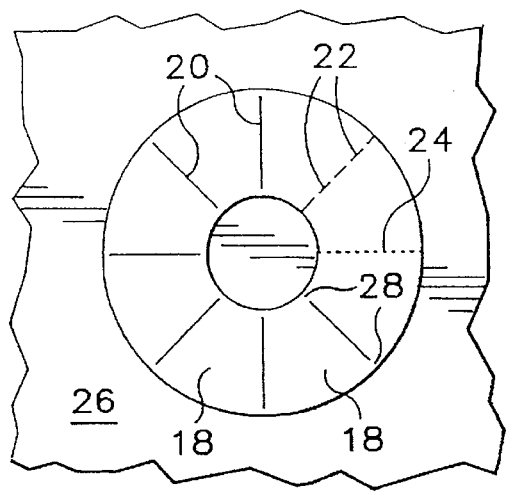
FIG. 3 is a plan view of the seal.

Preferably, and especially in the event that the seal is made of a material, such as that sold under the designation Mylar 7872, that does not break up spontaneously when it is peeled from a surface to which it has been attached, the seal has several, e.g. eight, radial lines of weakness distributed equiangularly about the center of the seal and dividing the seal into multiple sectors 18, as shown in FIG. 3. It is preferred that each line of weakness be a single continuous cut, as shown at 20, but it may alternatively be composed of discrete segments 22 or perforations 24. In the case of a single continuous cut, the cut does not extend completely from the inner periphery of the seal to the outer periphery thereof but leaves a narrow neck 28 approximately one-sixteenth inch (about 0.16 cm) wide in tact between each two adjacent sectors at the inner periphery and/or the outer periphery of the seal, so that the seal can be removed from the release sheet in one piece. When a curious or bored student attempts to remove the seal from the bottom wall of the mouse housing, the seal breaks at the line of weakness because the strength of the adhesion of the seal to the housing exceeds the strength of seal at the line of weakness and so the seal cannot be removed in one piece. Therefore, it is tedious and time consuming to remove the seal and the student is likely to move on to other opportunities for mischief rather than continue the attempt to remove the seal.

It will be appreciated that the invention is not restricted to the particular embodiment that has been described, and that variations may be made therein without departing from the scope of the invention as defined in the appended claims and equivalents thereof. For example, the invention is not restricted to use with a computer mouse in which the opening in the bottom wall of the housing is circular. It may, for example, be possible to employ a retainer plate that slides into and out of engagement with the bottom wall by linear, rather than rotational, movement, in which case the retainer plate would generally be substantially rectangular. The same configuration of seal could be used, so long as the seal adheres to both the bottom wall of the housing and the retainer plate without encroaching on the hole in the retainer plate.

I claim:

1. A computer mouse comprising:
   a housing having a bottom wall that defines an opening,
   a retainer plate fitted in the opening and formed with a circular hole,
   a mouse ball in the housing and projecting through the circular hole, and
   a seal that adheres removably to both the bottom wall of the housing and the retainer plate, whereby removal of the retainer plate from the opening is resisted, the seal comprising a sheet-form piece of self-adhesive film material, and wherein the seal is formed with at least one line of weakness and the adhesive is selected relative to tensile strength of the seal across the line of weakness such that the exceeds the tensile strength of the seal across the line of weakness, whereby the seal breaks into at least two fragments when force is applied tending to remove the seal from the retainer plate.

2. A computer mouse according to claim 1, wherein the seal defines a circular hole that is concentric with the hole in the retainer plate.

3. A computer mouse according to claim 2, wherein the opening defined by the bottom wall of the housing is circular and is concentric with the circular hole in the retainer plate, and the seal is annular having an inner diameter greater than the diameter of the hole in the retainer plate and less than the diameter of the opening, and an outer diameter that is greater than the diameter of the opening.

4. A computer mouse according to claim 1, wherein the seal is made of a self-adhesive synthetic polymer material.

5. A computer mouse according to claim 1, wherein the seal is made of an opaque material.

6. A seal for a computer mouse that includes a housing having a bottom wall that defines an opening, a retainer plate fitted in the opening and formed with a circular hole, and a mouse ball in the housing and projecting through the circular hole, the seal comprising a sheet-form piece of self-adhesive material defining a hole that is larger than the circular hole in the retainer plate, and wherein the seal has an extent such that when it is applied to the retainer plate with the hole in the seal concentric with the hole in the retainer plate, the seal adheres to both the bottom wall of the housing and the retainer plate, whereby removal of the retainer plate from the opening is resisted, and wherein the seal is formed with at least one line of weakness and the adhesive is selected relative to tensile strength of the seal across the line of weakness such that the seal adheres to at least the retainer plate with a force that exceeds the tensile strength of the seal across the line of weakness, whereby the seal breaks into at least two fragments when force is applied tending to remove the seal from the retainer plate.

7. A seal according to claim 6, the seal being annular and wherein the line of weakness extends radially of the seal.

8. A seal according to claim 7, wherein the seal is formed with at least two radial lines of weakness that are equiangularly spaced.

9. A seal according to claim 6, the seal having a circular inner periphery that bounds the hole in the seal and a circular outer periphery that is concentric with the inner periphery, and wherein the seal is formed with at least two lines of weakness that are equiangularly spaced and extend radially of the seal from just outside the inner periphery to just inside the inner periphery, whereby adjacent sectors of the seal are connected by at least one narrow neck.

10. A computer mouse comprising:

a housing having a bottom wall that defines a circular opening, a retainer plate fitted in the opening and formed with a circular hole concentric with the circular hole in the retainer plate, a mouse ball in the housing and projecting through the circular hole, and an annular seal defining a circular hole that is concentric with the hole in the retainer plate, the annular seal having an inner diameter greater than the diameter of the hole in the retainer plate and less than the diameter of the opening, and an outer diameter that is greater than the diameter of the opening, the seal adhering to both the bottom wall of the housing and the retainer plate, whereby removal of the retainer plate from the opening is resisted.

11. A computer mouse according to claim 10, wherein the seal is a sheet-form piece of self-adhesive film material.

12. A computer mouse according to claim 10, wherein the seal is made of an opaque material.

13. A computer mouse according to claim 1, wherein the seal is annular, having an inner periphery and an outer periphery, and the line of weakness extends from the outer periphery to the inner periphery.

14. A computer mouse according to claim 13, wherein the line of weakness extends radially of the seal.

15. A computer mouse according to claim 14, wherein the seal is formed with at least two radial lines of weakness that are equiangularly spaced.

16. A computer mouse according to claim 1, wherein the seal defines a hole that is larger than the circular hole in the retainer plate and has a circular inner periphery that bounds the hole in the seal and a circular outer periphery that is concentric with the inner periphery, and wherein the seal is formed with at least two lines of weakness that are equiangularly spaced and extend radially of the seal from just outside the inner periphery to just inside the inner periphery, whereby adjacent sectors of the seal are connected by at least one narrow neck.

* * * * *